United States Patent
Yonezawa

[11] Patent Number: 5,956,303
[45] Date of Patent: Sep. 21, 1999

[54] OPTICAL DISK APPARATUS CAPABLE OF STABLE TRACKING CONTROL

[75] Inventor: Minoru Yonezawa, Tokyo, Japan

[73] Assignee: Kabushiki Kaisha Toshiba, Kawasaki, Japan

[21] Appl. No.: 08/915,635

[22] Filed: Aug. 21, 1997

[30] Foreign Application Priority Data

Aug. 22, 1996 [JP] Japan .................................. 8-221161

[51] Int. Cl.⁶ .................................................. G11B 7/09
[52] U.S. Cl. ...................... 369/44.28; 369/44.32
[58] Field of Search .............. 369/44.28, 44.27, 369/44.29, 44.34, 44.35, 44.32, 47, 48, 54, 58, 124

[56] References Cited

U.S. PATENT DOCUMENTS 5,130,963  7/1992  Satoshi .
5,197,058  3/1993  Bell, Jr. et al. ...................... 369/44.28

*Primary Examiner*—Muhammad Edun
*Attorney, Agent, or Firm*—Pillsbury Madison & Sutro LLP

[57] ABSTRACT

The amount of inclination of an optical beam relative to the surface of an optical disk as a target is detected by a disk inclination detector. When a track jump instruction is generated, a track jump controller determines whether or not the inclination amount is within a predetermined range in which tracking control and a track jump operation can be performed in a stable manner. If the inclination amount is within the predetermined range, the track jump operation is started. As a result, the track jump operation to a target track can be performed in a stable and reliable manner.

20 Claims, 6 Drawing Sheets

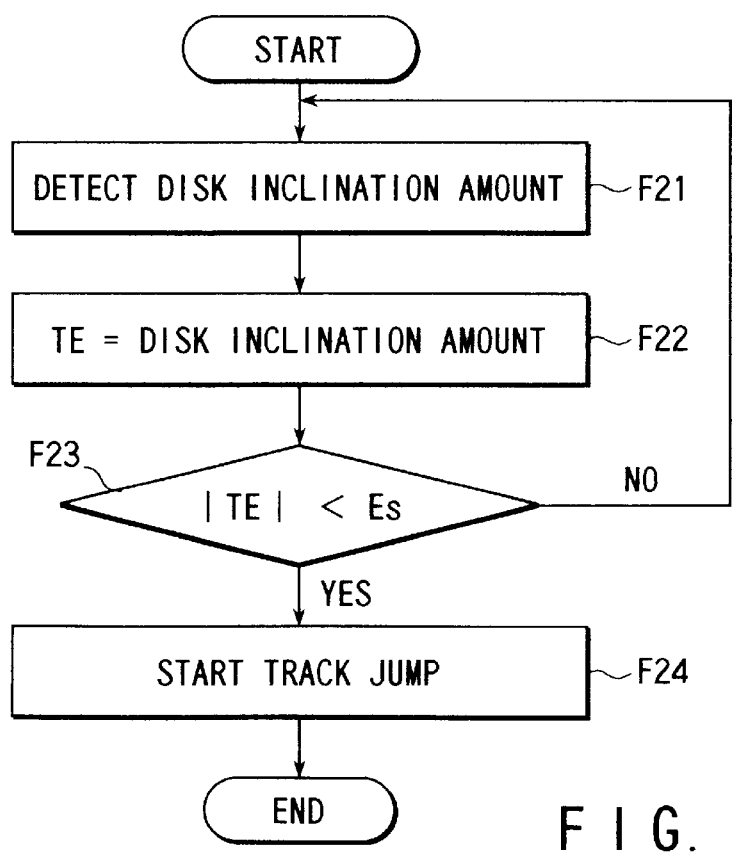
F I G. 4

OPTICAL DISK APPARATUS CAPABLE OF STABLE TRACKING CONTROL

BACKGROUND OF THE INVENTION

The present invention relates to an optical disk apparatus for recording and/or reproducing data to or from an optical disk having information record tracks.

In general, the optical disk apparatus uses a coarse actuator for performing coarse positioning and a fine actuator for performing fine positioning. These actuators cause an optical beam spot to follow the target track on the optical disk.

In the conventional optical disk apparatus, only a fine actuator is driven to perform a track jump and move an optical beam spot to the next track. The fine actuator used may be one of several different types. For example, the fine actuator may be a lens actuator type for moving a lens itself in a tracking direction, or a tracking mirror type for swinging an optical beam to position an optical beam spot.

When using either the lens actuator type or the tracking mirror type actuator, the tracking control is performed on the basis of a tracking error signal. FIG. 1 shows a method for detecting the tracking error signal. In this method, light beam 5 involving a tracking error is incident on tracking detection light-receiving elements 7a and 7b constituting a divided photodetector 7. The light beam 5 is converted into electric signals indicative of the amount of light. The electric signals are subtracted in a differential amplifier 8, to obtain the tracking error signal. The track jump operation is performed during tracking control in response to a track jump instruction.

During usual tracking control, a compensation signal is generated by a tracking compensation circuit 10 on the basis of the tracking error signal from the differential amplifier 8, as is shown in FIG. 2. This compensation signal is supplied to a fine actuator driving control circuit 24 via a switch 22, to thereby control a fine actuator 26. At the time of the track jump operation, a positive or negative jump pulse corresponding to a movement direction is generated from a jump pulse generating circuit 20 and the switch 22 is switched, in response to the track jump instruction. As a result, the jump pulse is input to only the fine actuator 26 via the fine actuator driving control circuit 24, thereby accelerating or decelerating the actuator 26 to execute track jump of the optical beam spot.

Concerning the tracking error signal necessary to tracking control, it is known that an offset occurs in the signal when the fine actuator 26 is displaced. The amount of the offset is proportional to the amount of displacement of the fine actuator. For example, the greater the amount of displacement, the greater the amount of the offset. Thus, the offset in the tracking error signal makes the tracking control unstable.

Specifically, when the fine actuator 26 is displaced a large amount at the time of the track jump operation, an offset corresponding to the amount of displacement will occur in the tracking error signal. Where the tracking mirror type actuator is used as the fine actuator 26, and the tracking mirror of the actuator is driven at the time of the track jump operation, the optical beam spot or optical beam itself is greatly shifted a large amount according to the rotation of the tracking mirror. This causes an offset in a tracking error signal detected by the divided photodetector 7 after reflected from the surface of the optical disk.

On the other hand, where the lens actuator is used as the fine actuator 26, the optical axis of the lens itself is shifted from the line of the optical beam. This shifts the line of an optical beam reflected from the optical disk, causing an offset in the tracking error detection system. Although the manner of occurrence of an offset in the tracking error signal and the rate of the offset differ between the two types of actuators, the influence of the offset upon tracking is conspicuous at the time of the track jump operation in which the fine actuator 26 is greatly shifted.

As described above, in the optical disk apparatus, an offset inevitably occurs in the tracking error signal at the time of the track jump operation. Therefore, the tracking control itself is very unstable, making it difficult to finely converge onto a target track.

While more strict specifications are required for recording and/or reproducing data with a reduction in the interval between tracks made to realize high density recording, the effect of the inclined surface of an optical disk relative to the line of an optical beam may increase when the optical disks clamped and rotated, thereby degrading read/write data signals. Further, it is known that the inclination not only degrades the read/write data signals but also causes an offset in the tracking error signal. The offset not only makes the tracking control unstable but also increases the instability of the tracking control when performing the track jump operation.

To keep the quality of signals within a predetermined range, so-called tilt servo control is generally executed in which the inclination amount of the normal line of the optical disk surface relative to the line of the optical beam is detected and reduced to zero. However, in the tilt servo control, high-speed correction is not performed and the inclination is corrected slowly, and accordingly the tracking control is executed for a long time with the inclination amount kept at a relatively high value. In other words, even if the tilt servo control is executed, the amount of inclination may be large momentarily. If the track jump operation is performed at that moment, the tracking control and the track jump control itself will inevitably become unstable.

Furthermore, if an inclination detector incorporated in a circuit for the tilt servo control detects the inclination using a signal depending upon the optical beam spot, for example, using a signal output from the divided photodetector 7, the amount of the inclination detected for the tilt servo control is multiplied by an offset signal due to a jump signal when performing the track jump operation. As a result, the tilt servo control is performed on the basis of the offset signal, which means that an error operation is performed instead of fine tilt servo control.

As described above, at the time of performing the track jump operation, the fine actuator is driven, and the tracking error signal is multiplied by an offset signal resulting from the displacement of the fine actuator. This makes it hard to correctly move an optical beam to a target track, and may well make the tracking control and the track jump control itself unstable. On the other hand, the inclination of the optical beam relative to the surface of the optical disk causes multiplication of the tracking error signal by the offset signal, thereby increasing the instability of the tracking control. Thus, execution of the track jump operation in the state that the line of the optical beam is greatly inclined relative to the normal line of the surface of the optical disk causes the target track not to be reached, and also causes an increase in the instability of the tracking control and track jump control.

BRIEF SUMMARY OF THE INVENTION

Accordingly, it is an object of the present invention to provide an optical disk apparatus capable of performing stable and reliable tracking control and track jump control irrespective of the inclination of the surface of an optical disk employed therein.

According to one aspect of the present invention, a detecting circuit detects an inclination amount of an optical beam line relative to a line normal to the surface of an optical disk. A determining circuit determines whether or not the detected inclination amount is within a predetermined range. The determining circuit is also responsive to an instruction to perform a track jump operation. A control circuit controls the performance of the track jump operation according to the determination that the inclination amount is within the predetermined range.

According to another aspect of the present invention, an optical disk apparatus comprises a detecting circuit which detects an inclination amount of an optical beam line relative to a line normal to the surface of an optical disk. A first determining circuit determines whether or not the direction of an offset due to the track jump operation corresponds to the direction of an offset due to the disk inclination. If the directions are identical, it is determined that the track jump operation is in an offset increasing direction. The first determining circuit is responsive to an instruction to perform a track jump operation. A second determining circuit determines whether the detected inclination amount is within a first predetermined range. The second determining circuit makes its determination when the first determining circuit indicates that the direction of an offset due to the track jump operation is increasing when compared with the direction of an offset due to the direction of an offset from disk inclination. A third determining circuit determines whether or not the detected inclination amount is within a second predetermined range, the second predetermined range being wider than the first predetermined range. The third determining circuit makes its determination when the first determining circuit indicates that the direction of an offset due to the track jump operation is increasing when compared with the direction of an offset due to the direction of an offset from disk inclination. A control circuit controls the performance of the track jump operation according to the determination that the inclination amount is within the first predetermined range, or according to the determination that the inclination amount is within the second predetermined range.

Each of the above apparatuses may further comprise a memory for storing a pattern of changes of the inclination amount with time outputted from the detection circuit. In this case, the control circuit may control the performance of the track jump operation by referring to the memory. The control circuit may control the performance of the track jump operation when the pattern in the memory indicates that the inclination amount is decreasing.

Each of the above apparatuses may further comprise a disk inclination correcting circuit for supplying a correction servo signal for making zero the inclination amount; and a servo actuator for controlling to make zero the inclination amount in accordance with the supplied correction servo signal. In this case, the control circuit may include a circuit for preventing the correction servo signal from being supplied to the servo actuator during the track jump operation.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a flowchart, useful in explaining one specific operation of a track jump determination circuit incorporated in the first embodiment of FIG. 3;

DETAILED DESCRIPTION OF THE INVENTION

The embodiments of the present invention will be described with reference to the accompanying drawings.

Figure 3:
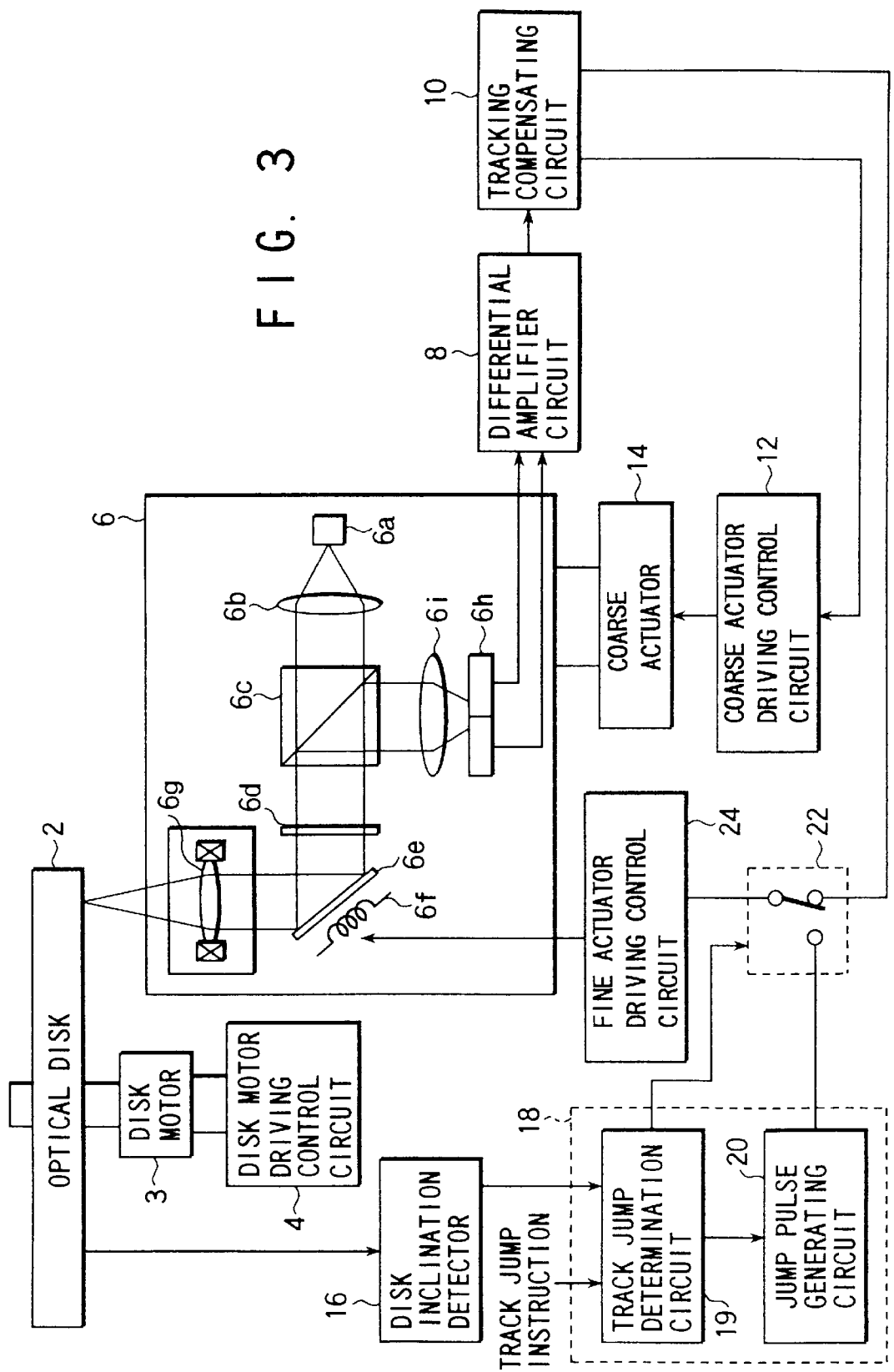
FIG. 3 is a block diagram, showing an optical disk apparatus according to a first embodiment of the present invention.

FIG. 3 shows an optical disk apparatus according to a first embodiment of the present invention. A plurality of spiral or concentric data recording tracks are formed in the surface of an optical disk 2. This disk is driven to rotate by a disk motor 3 under the control of a disk motor driving control circuit 4.

Reproduction of data recorded on the optical disk 2 and record of data into the disk 2 are performed by an optical head 6.

In the optical head 6, light from a semiconductor laser oscillator 6a is collimated by a collimator lens 6b, and collimated light is guided to a polarizing beam splitter 6c. The light having passed the polarizing beam splitter 6c is guided to a λ/4 plate 6d, where the deflection angle of the light is shifted by 90°. Thereafter, the light is reflected by a mirror 6e and guided to an objective lens 6g. Through the objective lens 6g, the light is converged onto the optical disk 2 which is rotating in a steady state, thereby forming an optical beam spot.

Light reflected from the optical disk 2 returns to the polarizing beam splitter 6c via the objective lens 6g, the mirror 6e and the λ/4 plate 6d, reflects thereon and enters a divided photodetector 6h via a lens 6i. In the divided photodetector 6h, the light is converted into photoelectric conversion signals as a result of photoelectric conversion. The photoelectric conversion signals are converted into a tracking error signal in the differential amplifier θ.

The tracking error signal is input to a tracking compensating circuit 10, where the signal is amplified and converted into a coarse actuator driving signal and a fine actuator driving signal. The coarse actuator driving signal is supplied to a coarse actuator driving control circuit 12, while the fine actuator driving signal are supplied to a fine actuator driving control circuit 24 via a switch 22. In response to the input driving signal, the coarse actuator driving control circuit 12 drives a coarse actuator 14 for coarsely positioning the optical head 6 or part of the head 6. On the other hand, in response to the input driving signal, the fine actuator driving control circuit 24 drives, when the fine actuator is a tracking mirror 6e, a coil 6f for rotating the tracking mirror 6e, to thereby finely positioning the optical beam spot on the target track.

Track jump controller 18 activates a track jump determination circuit 19 when it inputs a track jump instruction from the outside. The track jump determination circuit 19 determines whether or not a track jump operation should be performed, on the basis of an inclination amount of the surface of the optical disk 2 to the line of the optical beam detected by disk inclination detector 16. The determination circuit 19 disables the track jump operation until it determines that the operation is permitted. For example, the track jump operation is permitted only when it is determined that the absolute value of the inclination amount is lower than a predetermined value. When the track jump operation is permitted, the switch 22 is switched by the determination circuit 19 at once to input a track jump signal from the jump pulse generating circuit 20 to the fine actuator driving control circuit 24, thereby driving the fine actuator to perform the track jump operation.

In the case where the fine actuator is of the lens actuator type, the fine actuator driving control circuit 24 drives the fine actuator to displace part or all of the optical head 6, thereby finely positioning an optical beam spot on a target track.

Referring then to FIG. 4, the operation of the track jump determination circuit 19 will be described. After the inclination amount is detected by the disk inclination detector 16 (step F21), the absolute value of the inclination amount TE is compared with a predetermined value Es (steps F22, F23). If it is determined that the absolute value is lower than the predetermined value, the track jump operation is permitted (step F24), while if the absolute value is equal to or higher than the predetermined value, the program returns to the step F21, thereby repeating the steps F21–F23.

A value not more than 10 mrd is appropriate as the predetermined value Es for the inclination amount of the optical beam relative to the normal line of the surface of the optical disk.

Figure 5:
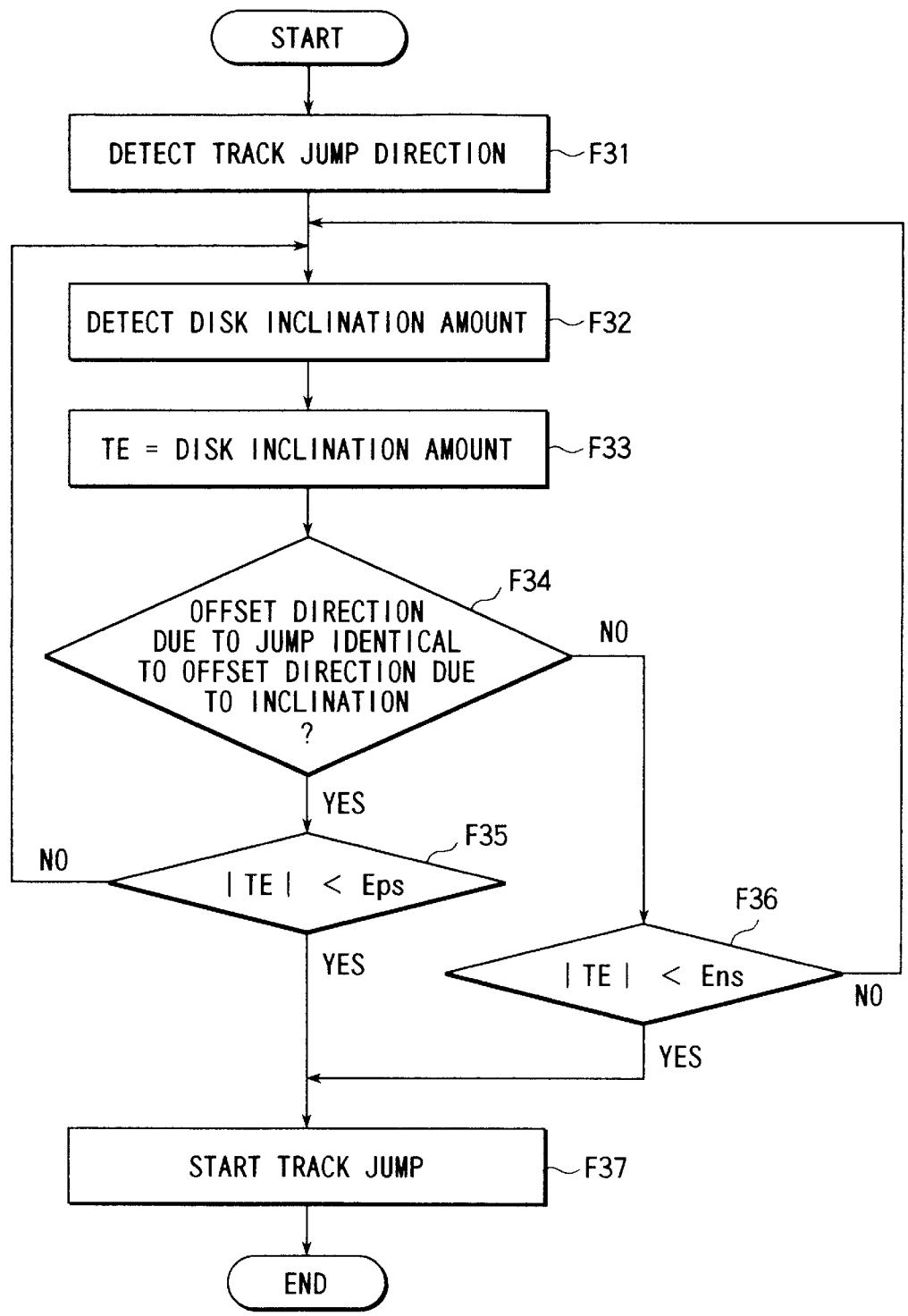
FIG. 5 is a flowchart, useful in explaining another operation of the track jump determination circuit incorporated in the first embodiment of FIG. 3.

The track jump determination circuit 19 may operate as shown in FIG. 5. First, a direction of the track jump is detected (step F31), and then the inclination amount of the optical disk is detected (step F32).

As described below, the inclination amount of the optical disk is compared with the predetermined value Eps or Ens instead of Es (Eps<Ens) depending upon whether or not the direction of an offset due to the track jump corresponds to the direction in which an offset due to the disk inclination is increased.

Specifically, the inclination amount of the optical disk is set at TE (step F33), and the direction of an offset due to the track jump is compared with the direction of an offset due to the inclination of the disk (step F34). If these directions are identical, it is determined that the track jump direction is an offset increasing direction, and the absolute value of the disk inclination amount TE is compared with the predetermined value Eps (step F35). If the absolute value of TE is lower than the predetermined value Eps, the program proceeds to a step F37, where the track jump operation is started. If, on the other hand, it is determined in the step F35 that the absolute value of TE exceeds the predetermined value Eps, the program returns to the step F32, thereby detecting again the disk inclination amount.

If it is determined in the step F34 that the directions are not identical to each other, it is determined that the direction of an offset due to the track jump is the direction in which the offset due to the disk inclination decreases, and the absolute value of TE is compared with the other predetermined value Ens which is higher than the value Eps (step F36). If the former is lower than the latter, the program proceeds to the step F37, thereby starting the track jump operation. On the other hand, if the absolute value of TE is higher than the predetermined value Ens, the program returns to the step F32, and the steps F32–F34 are repeated.

As described above, in the optical disk apparatus of the embodiment, the inclination amount of the line of the optical beam relative to the normal line of the target optical disk is detected, and it is determined, when the track jump operation is instructed, whether or not the inclination amount falls within a predetermined range in which the tracking control and the track jump operation can be performed reliably, whereby the track jump operation is started when the inclination amount falls in the predetermined range. As a result, stable and reliable jump to a target track can be realized.

Figure 6:
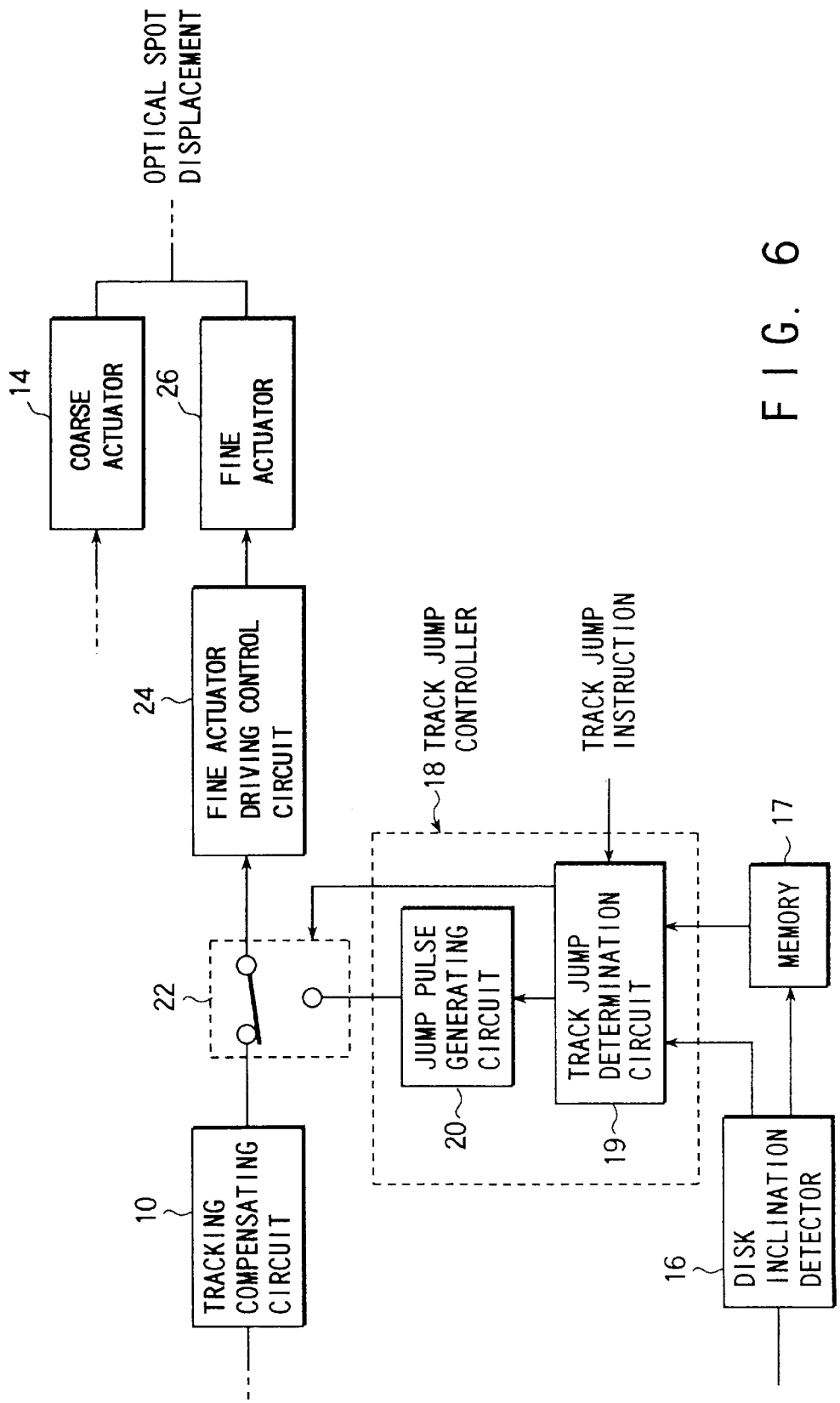
FIG. 6 is a block diagram, showing part of an optical disk apparatus according to a second embodiment of the present invention.

Referring then to FIG. 6, an optical disk apparatus according to a second embodiment of the present invention will be described. This optical disk apparatus is similar to the apparatus of the first embodiment shown in FIG. 3 except that the former further comprises a memory 17 for storing an output from the disk inclination detector 16. The apparatus of the second embodiment has been developed in consideration of detected changes with time in the disk inclination amount. That is, the track jump operation is started in synchronism with the rotation of the disk on the basis of the pattern of the changes stored in the memory, or the track jump operation is permitted by detecting the pattern of the changes indicating that the inclination amount is decreasing.

As described above, the inclination amount detected by the disk inclination detector 16 is temporarily stored in the memory 17 and referred to at the time of performing a determination in the track jump determination circuit 19, thereby realizing a reliable track jump operation.

Figure 1:
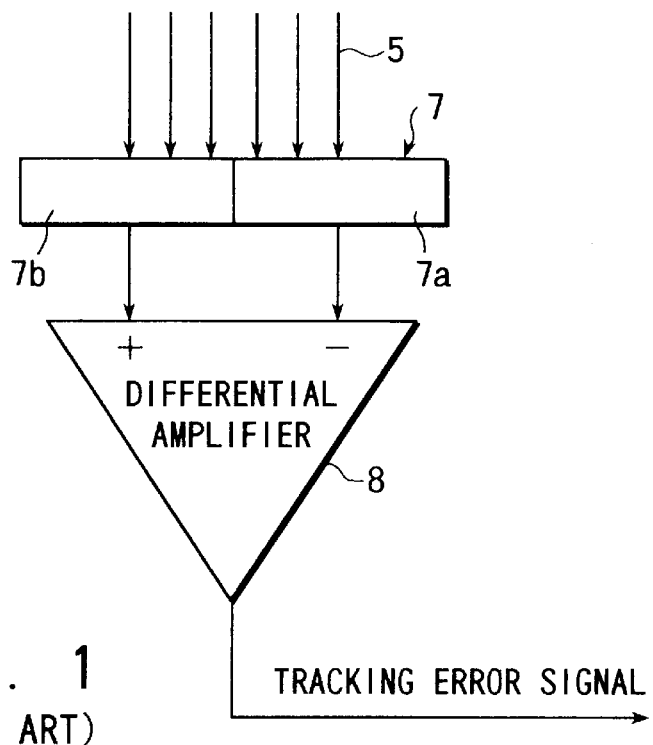
FIG. 1 is a view, useful in explaining a method for detecting a tracking error signal.
Figure 2:
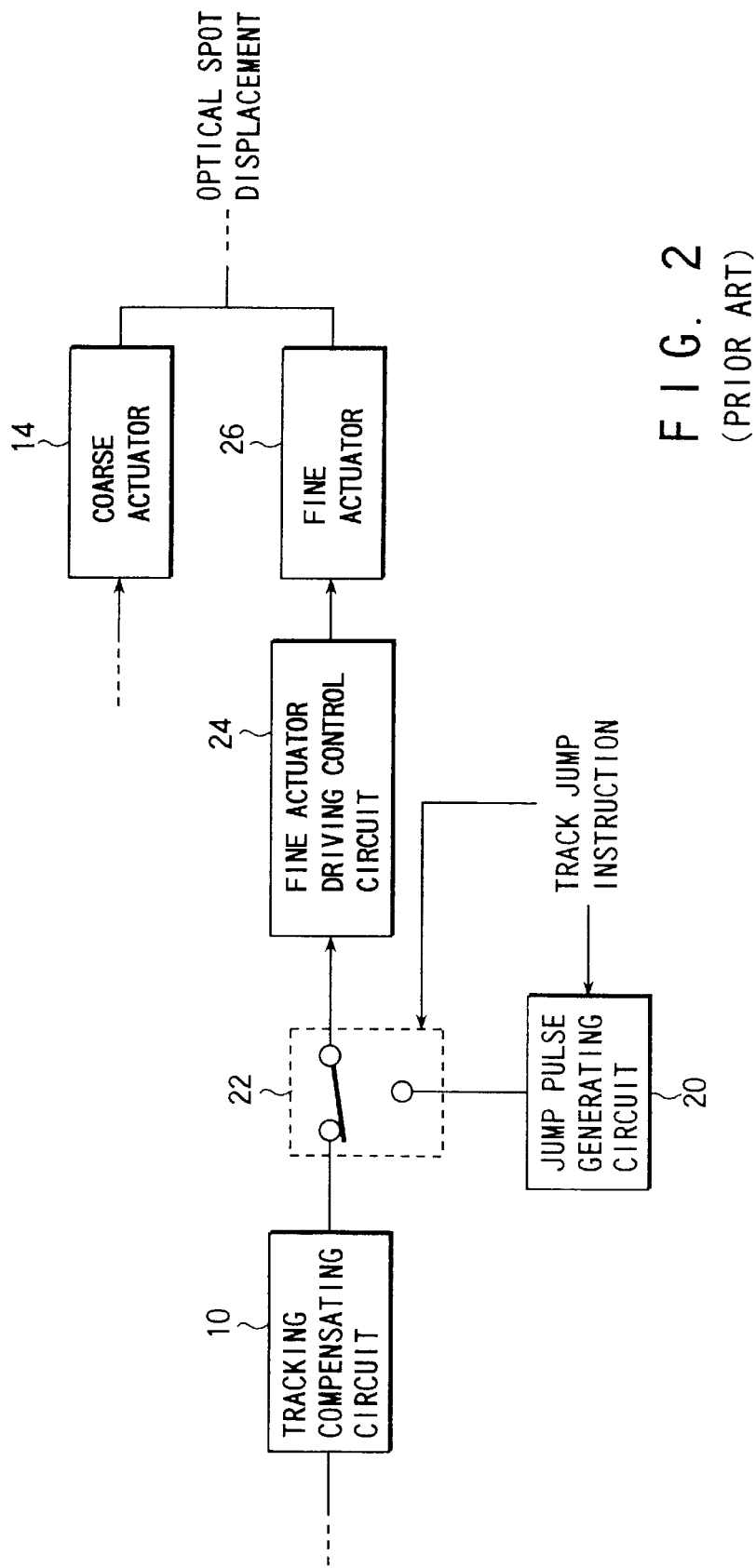
FIG. 2 is a block diagram, showing a control section incorporated in the conventional disk apparatus.
Figure 7:
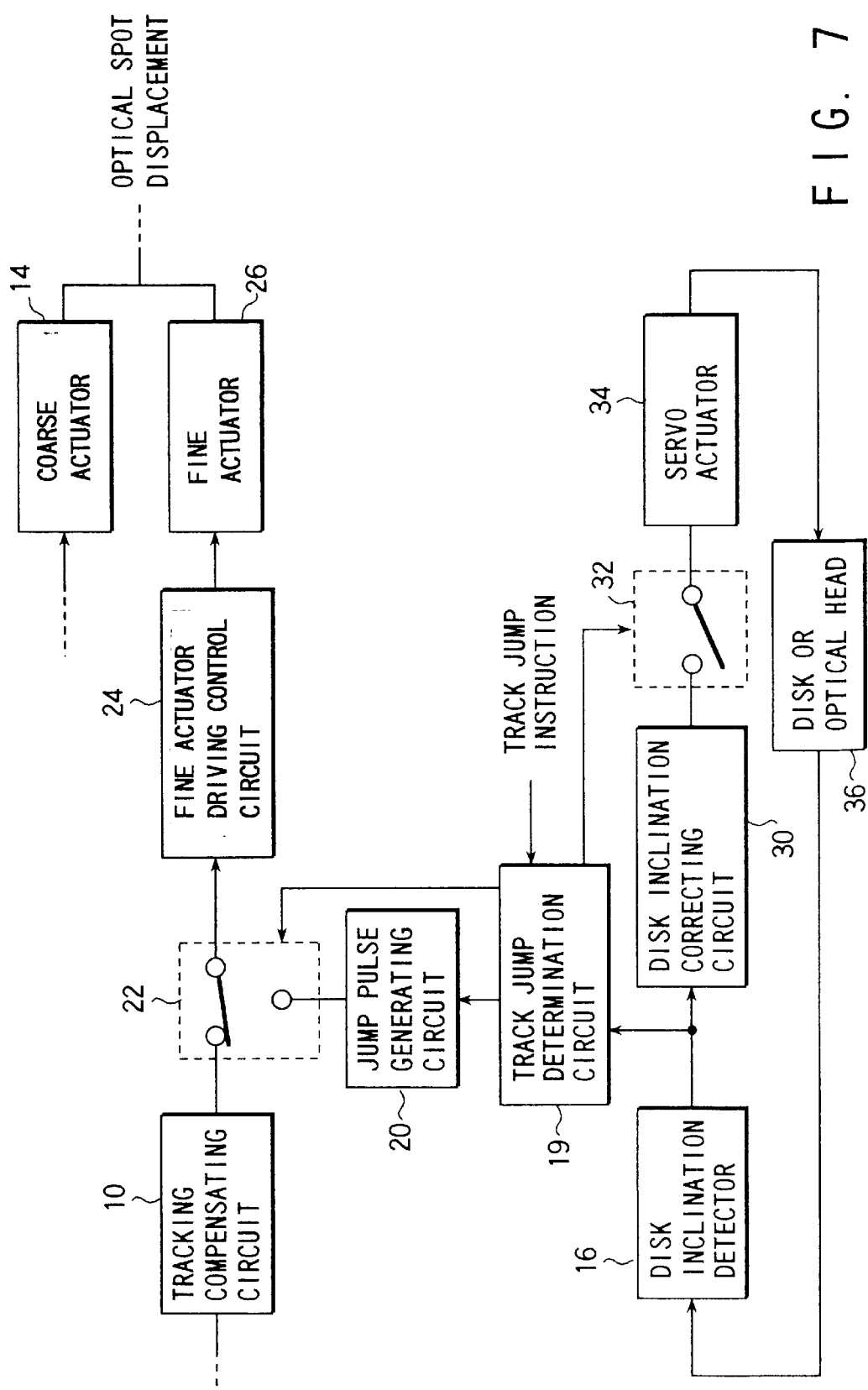
FIG. 7 is a block diagram, showing part of an optical disk apparatus according to a third embodiment of the present invention.

Referring then to FIG. 7, an optical disk apparatus according to a third embodiment of the present invention will be described. This apparatus differs from the apparatus of FIG. 1 in that it further comprises a disk inclination correcting circuit 30, a switch 32 and a servo actuator 34.

In the usual operation, a correction servo signal for making zero the inclination amount of the optical disk detected by the disk inclination detector 16 is output from the disk inclination correcting circuit 30 to the servo actuator 34 via the switch 32. In response to the servo signal, the servo actuator 34 controls the disk or an optical head 36 to make zero the inclination amount of the disk.

On the other hand, in the track jump operation, the switch 32 is opened by the track jump determination circuit 19, and the correction servo signal output immediately before the track jump operation is held by the servo actuator 34. After the track jump operation is finished, the switch 32 is closed by the track jump determination circuit 19, thereby restarting the servo control to make zero the inclination amount of the disk.

As described above, where the servo correcting mechanism comprising the disk inclination correcting circuit 30 and the servo actuator 34 is incorporated, the servo control is temporarily stopped and the inclination correcting servo signal input at the start of the track jump operation is held, until the track jump operation is finished, to prevent the servo signal from being mixed with an optical signal generated when the track jump operation is performed. As a result, the servo mechanism is protected from malfunction due to mixture of the optical signal and the inclination correcting servo signal, and accordingly the track jump operation can be performed in a stable and reliable manner.

Thus, the optical disk apparatus of the present invention can perform tracking control and track jump control in a stable and reliable manner irrespective of whether or not the optical disk inclines.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. An optical disk apparatus comprising:
    a detecting circuit which detects an inclination amount of an optical beam line relative to a normal line of an optical disk surface;
    a determining circuit which determines whether or not the detected inclination amount is within a predetermined range; and
    a control circuit which controls a track jump operation in response to an instruction according to the determination that the inclination amount is within the predetermined range.

2. The apparatus according to claim 1, further comprising a memory for storing a pattern of changes of the inclination amount with time outputted from said detection circuit.

3. The apparatus according to claim 2, wherein said control circuit controls the performance of the track jump operation by referring to said memory.

4. The apparatus according to claim 3, wherein said control circuit controls the performance of the track jump operation when the pattern in said memory indicates that the inclination amount is decreasing.

5. The apparatus according to claim 1, further comprising:
    a disk inclination correcting circuit configured to supply a correction servo signal for making the inclination amount zero; and
    a servo actuator configured to make the inclination amount zero in accordance with the supplied correction servo signal.

6. The apparatus according to claim 5, wherein said control circuit includes a circuit which prevents the correction servo signal from being supplied to said servo actuator during the track jump operation.

7. An optical disk apparatus comprising:
    a detecting circuit which detects an inclination amount of an optical beam line relative to a normal line of an optical disk surface;
    a first determining circuit which determines whether or not the direction of an offset due to a track jump operation corresponds to the direction of an offset due to the disk inclination;
    a second determining circuit which determines whether or not the detected inclination amount is within a first predetermined range, when said first determining circuit indicates that the direction of the offset due to the track jump operation corresponds to the direction of an offset due to the disk inclination;
    a third determining circuit which determines, when said first determining circuit indicates non-correspondence of directions, whether or not the detected inclination amount is within a second predetermined range, the second predetermined range being wider than the first predetermined range; and
    a control circuit which controls the track jump operation when the second determining circuit determines that the inclination amount is within the first predetermined range, or when said third determining circuit determines that the inclination amount is within the second predetermined range.

8. The apparatus according to claim 7, further comprising a memory for storing a pattern of changes of the inclination amount with time outputted from said detection circuit.

9. The apparatus according to claim 8, wherein said control circuit controls the track jump operation by referring to said memory.

10. The apparatus according to claim 9, wherein said control circuit controls the track jump operation when the pattern in said memory indicates that the inclination amount is decreasing.

11. The apparatus according to claim 7, further comprising:
    a disk inclination correcting circuit which supplies a correction servo signal for making the inclination amount zero; and
    a servo actuator which makes the inclination amount zero in accordance with the supplied correction servo signal.

12. The apparatus according to claim 11, wherein said control circuit includes a circuit which prevents the correction servo signal from being supplied to said servo actuator during the track jump operation.

13. A track jump control method for use in an optical disk apparatus, comprising the steps of:
    detecting an inclination amount of a line of an optical beam relative to a normal line of a surface of an optical disk;
    in response to an instruction of a track jump operation, determining whether or not the detected inclination amount is within a predetermined range; and
    controlling the track jump operation in accordance with the determination that the inclination amount is within the predetermined range.

14. The method according to claim 13, further comprising the step of storing a pattern of changes of the inclination amount with time.

15. The method according to claim 14, wherein said controlling step includes the step of controlling the track jump operation by referring to the stored pattern.

16. The method according to claim 13, further comprising the steps of:
    supplying a correction servo signal for making the inclination amount zero;
    making the inclination amount zero by an actuator in accordance with the supplied correction servo signal; and
    preventing the correction servo signal from being supplied to the servo actuator during the track jump operation.

17. A track jump control method for use in an optical disk apparatus, comprising the steps of:

detecting an inclination amount of an optical beam line relative to a normal line of an optical disk surface;

in response to an instruction of a track jump operation, determining whether or not the direction of an offset due to the track jump operation corresponds to the direction of an offset due to the disk inclination;

when said first determination indicates that the offset direction due to the track jump operation corresponds to the offset direction due to the disk inclination, determining whether or not the detected inclination amount is within a first predetermined range;

when said first determination indicates that the track jump operation offset direction does not correspond to the offset direction due to the disk inclination, determining whether or not the detected inclination amount is within a second predetermined range, which is wider than the first predetermined range; and controlling the track jump operation in accordance with the determination that the inclination amount is within the second predetermined range.

18. The method according to claim 17, further comprising the step of storing a pattern of changes of the inclination amount with time.

19. The method according to claim 18, wherein said controlling step includes the step of controlling the track jump operation by referring to the stored pattern.

20. The method according to claim 17, further comprising the steps of:

supplying a correction servo signal for making the inclination amount zero;

making the inclination amount zero by an actuator in accordance with the supplied correction servo signal; and preventing the correction servo signal from being supplied to the servo actuator during the track jump operation.

* * * * *